(12) United States Patent
Juillerat et al.

(10) Patent No.: US 8,132,035 B2
(45) Date of Patent: Mar. 6, 2012

(54) ETHERNET INTERFACE (75) Inventors: Eric Juillerat, Reno, NV (US); Hector Juillerat, Reno, NV (US); Charles Lanham, Reno, NV (US); Bruce Lipp, Reno, NV (US)

(73) Assignee: Raven Technology Group, LLC, Sparks, NV (US)

( * ) Notice: Subject to any disclaimer, the term of this patent is extended or adjusted under 35 U.S.C. 154(b) by 923 days.

(21) Appl. No.: 12/127,773

(22) Filed: May 27, 2008

(65) Prior Publication Data
US 2008/0294915 A1 Nov. 27, 2008

Related U.S. Application Data (60) Provisional application No. 60/940,359, filed on May 25, 2007.

(51) Int. Cl.
*G06F 1/00* (2006.01)
(52) U.S. Cl. .......................... 713/340; 340/538
(58) Field of Classification Search .................. 709/223; 713/300, 340; 340/538
See application file for complete search history.

(56) References Cited

U.S. PATENT DOCUMENTS

| 6,795,798 | B2 | 9/2004 | Eryurek et al. |
| 7,079,984 | B2 | 7/2006 | Eryurek et al. |
| 7,174,261 | B2 | 2/2007 | Gunn et al. |
| 7,221,261 | B1 | 5/2007 | Klingensmith et al. |
| 7,835,295 | B2 * | 11/2010 | Brewer et al. ............. 370/252 |
| 2003/0055958 | A1 * | 3/2003 | Russell et al. ............. 709/224 |
| 2004/0151168 | A1 | 8/2004 | Phillips et al. |
| 2005/0203987 | A1 | 9/2005 | Ewing et al. |
| 2005/0223090 | A1 | 10/2005 | Ewing et al. |
| 2005/0281326 | A1 | 12/2005 | Yu |
| 2006/0165097 | A1 | 7/2006 | Caveney |
| 2006/0215680 | A1 | 9/2006 | Camagna |
| 2006/0229848 | A1 | 10/2006 | Armstrong et al. |
| 2006/0241907 | A1 | 10/2006 | Armstrong et al. |
| 2006/0251179 | A1 | 11/2006 | Ghoshal |
| 2007/0019560 | A1 | 1/2007 | Brewer et al. |
| 2007/0057783 | A1 | 3/2007 | Reller |
| 2007/0081553 | A1 | 4/2007 | Cicchetti et al. |

* cited by examiner

*Primary Examiner* — Clifford Knoll
(74) *Attorney, Agent, or Firm* — Ian F. Burns & Associates, P.C.

(57) ABSTRACT

A network adaptor is disclosed that uses Power over Ethernet (PoE) protocols to derive power from an Ethernet port and provide the derived power to a field device. The network adapter communicates analog data with the field device and converts the analog data to digital data using an analog to digital converter before transmitting the digital data through the Ethernet port to a central office. The network adapter is uniquely assigned to the field device allowing an IP address to be assigned to the network adapter/field device system which may be accessed using IP protocols from any suitable browser.

32 Claims, 5 Drawing Sheets

ETHERNET INTERFACE

CROSS REFERENCE TO RELATED APPLICATIONS

This application claims priority to U.S. provisional patent application Ser. No. 60/940,359, filed May 25, 2007, the contents of which is herein incorporated by reference.

FIELD OF THE INVENTION

The present invention relates to industrial data acquisition and control systems and in particular to systems using Powered over Ethernet (PoE) protocols.

BACKGROUND

In many industrial applications, Systems Control And Data Acquisition (SCADA) may be performed through a number of deployed field devices. The field devices may be used for measuring such parameters as temperature, pressure, tank level, flow rate, valve state (e.g. open/closed) etc. or may be provided as control devices, e.g. valves. The field devices provide analog or digital signals to a Programmable Logic Controller (PLC) that provides the control logic for operating and monitoring an industrial process. The PLC may be provided at a central office such as within a PLC cabinet.

Communication between the field devices, in particular analog devices, and the PLC is typically provided using a bus network architecture operating a proprietary protocol. However, in order to enable data exchange between field devices and controllers of various manufacturers, a number of standard protocols were developed of which the Highway Addressable Remote Transducer (HART) protocol is just one example.

Traditional bus network architectures are limited by the number of nodes that can be supported. Large plant installations must therefore deploy numerous networks of field devices, with each network requiring a connection to an I/O module on a PLC. Thus for a large process plant or network of field devices, a number of PLCs may be required making integration of a complete system difficult. Technological advances as well as market demands for greater data acquisition and analysis are driving demands for higher bandwidth, greater throughput, faster data acquisition and faster information analysis than can be delivered by traditional bus network architectures, all at lower cost.

Industrial Ethernet standards are being developed to meet these demands with Ethernet gaining traction as the preferred factory network protocol because of its cost and performance benefits, hardware availability and ease of implementation. One such industrial Ethernet standard is IEEE 802.3af which has been developed as a standard for providing both communications and power through a single Ethernet cable. The system, termed Power over Ethernet (PoE) provides power and data through a single Ethernet cable, thereby reducing the cabling requirements for installations.

A problem that exists with implementing industrial Ethernet is that many existing field devices, in particular analog devices, are not configured for Ethernet communications. US Patent Application Serial No. 2007/0019560 (hereinafter Brewer) describes a system for communicating with field devices using PoE standards. Brewer appears to teach a system in which an interface module communicates by Ethernet protocols with a central office but by standard industrial protocols, e.g. HART, FieldBUS etc. on a bus architecture with field devices. The interface module appears to provide an intermediate device between an Ethernet enabled PLC or workstation and the bus network. Though the limitations of a bus network architecture are pushed further towards the outer edges of the network, the size, cost, speed and data limitations are still apparent, with any one interface module being limited to communication with up to four field devices and with the available power being shared across those four devices and the interface module.

SUMMARY OF ONE EMBODIMENT OF THE INVENTION

Advantages of One or More Embodiments of the Present Invention

The various embodiments of the present invention may, but do not necessarily, achieve one or more of the following advantages:

the ability to provide Ethernet communications all the way to an already deployed field device;

the ability to power a field device using PoE;

the ability to co-locate an Ethernet network adapter with a field device;

the ability to widely distribute field devices;

the ability to locate field devices in remote locations;

the ability to independently address a field device by IP protocol;

provide larger and more scaleable networks of field devices;

provide field device networks with greater functionality at lower cost; and provide a facility for supplementary power to be provided to a field device.

These and other advantages may be realized by reference to the remaining portions of the specification, claims, and abstract.

Brief Description of One Embodiment of the Present Invention

In one aspect, the invention provides a system for interfacing with an industrial process. A field device is configured to measure an industrial parameter and generate an analog signal containing data related to the industrial parameter. A network adapter is provided in communication with the field device. The network adapter has an Ethernet port and power circuitry configured to derive power from the Ethernet port. The derived power is used to power the field device. The network adapter reads the analog signal from the field device, generates digital data from the analog signal, and transmits the digital data to a communication network through the Ethernet port.

In one aspect, the invention provides a network adapter for providing communication with an industrial field device. The network adapter includes an analog communication circuit, a conversion circuit, a transmission circuit and power circuitry. The analog communication circuit is configured to receive analog signals from a field device. The conversion circuit is configured to convert the analog signals to digital data. The transmission circuit transmits the digital data to a communication network through an Ethernet port and the power circuitry derives power from the Ethernet port to power the network adapter.

In one aspect, the invention provides a method for providing an industrial parameter from a field device to a central office. In the method, power is derived from an Ethernet port of an Ethernet network adapter and used to power a field device. Industrial parameter data is measured from the field device in the Ethernet network adapter and converted to Ethernet data then transmitted from the Ethernet network adapter to the central office.

In one aspect, the invention provides an IP addressable field device system comprising a field device and a network adapter uniquely associated with the field device. The field device comprises an analog current loop. The network adapter has an analog current loop interface that interfaces with the analog current loop. An Ethernet module of the network adapter receives an IP address from a network and a data processing system that converts data from the analog current loop interface to Ethernet signals for transmission by the Ethernet module to the network.

In one aspect, the invention provides a field device system comprising an instrument that measures an analog signal and an Ethernet interface uniquely associated with the instrument. The Ethernet interface converts the analog signal to Ethernet packet data and transmits the Ethernet packet data from an Ethernet port. The field device system is powered by power derived from the Ethernet port. A network may be formed from a plurality of the field device systems, with each field device system communicating with a central office.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF CERTAIN EMBODIMENTS OF THE PRESENT INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Figure 1:
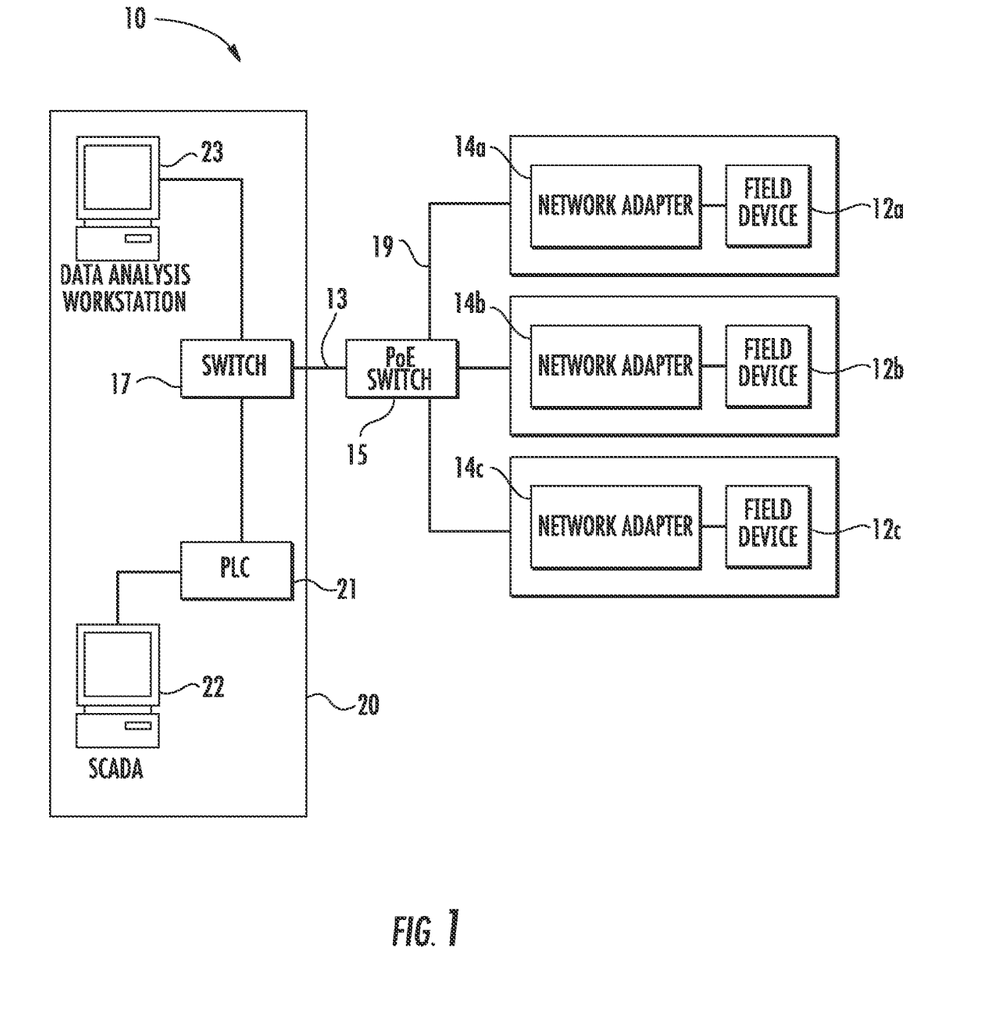
FIG. 1 is substantially a schematic view of a network in accordance with one embodiment of the present invention.

In FIG. 1, there is shown an industrial Ethernet network 10 in which a plurality of field devices 12a, 12b, 12c may be deployed for measurement and/or control of industrial components. The field devices may be any device capable of measuring an industrial parameter or providing a control signal to the component. For each field device 12a-12c, there is provided a respective configurable network adapter 14a, 14b, 14c that communicates with a PLC 21 and/or a workstation such as a SCADA workstation 22 at a central office 20.

Standard Ethernet cabling 19, such as Cat-5e cabling, may be run from each network adapter 14a-14c to a PoE enabled switch 15 that connects to the network adapters 14a-14c to the network 10 while providing power to the network adapters 14a-14c using PoE protocols as specified by the IEEE 802.3af standard. In turn, the network adapters 14a-14c can provide loop power, e.g. 24 VDC, to the respective attached field device 12a-12c with no additional wiring for data or power being required. Network connectivity 13 from the PoE switch 15 to the central office 20 can be accomplished through any number of media including Cat-5e cable, Fiber-optic cable, wireless radio etc. At the central office 20, the incoming network connection can be a standard switch, hub, or Ethernet module 17 that may distribute to multiple locations such as a PLC 21, SCADA workstation 22 or data analysis workstation 23.

The network adapter, referred to singularly by reference numeral 14 is a robust PoE powered device that performs the functions of both a communication interface and a power distribution hub, and is fully compliant with IEEE802.3af. It utilizes an embedded microprocessor to convert the standard analog output of a field instrument into an Ethernet packet that is readily transmitted over a LAN or WAN. The network adapter 14 may have the capability to act as a HART Master and communicate with and/or control HART enabled field instruments. The network adapter 14 may host an embedded web server that facilitates remote communication with it over any standard Ethernet network with a standard web browser. Intrinsic power management features enable the network adapter 14 to attenuate the incoming voltage to power the on-board integrated circuits and the loop powered field instruments that operate at 24 VDC. In one embodiment, an integrated device power sensing system allows the use of an external (non-PoE) 24 VDC source to power the analog loop in lieu of using the PoE voltage. Rugged packaging and a small form factor may allow the network adapter 14 to be installed directly on the field instrument.

Figure 2:
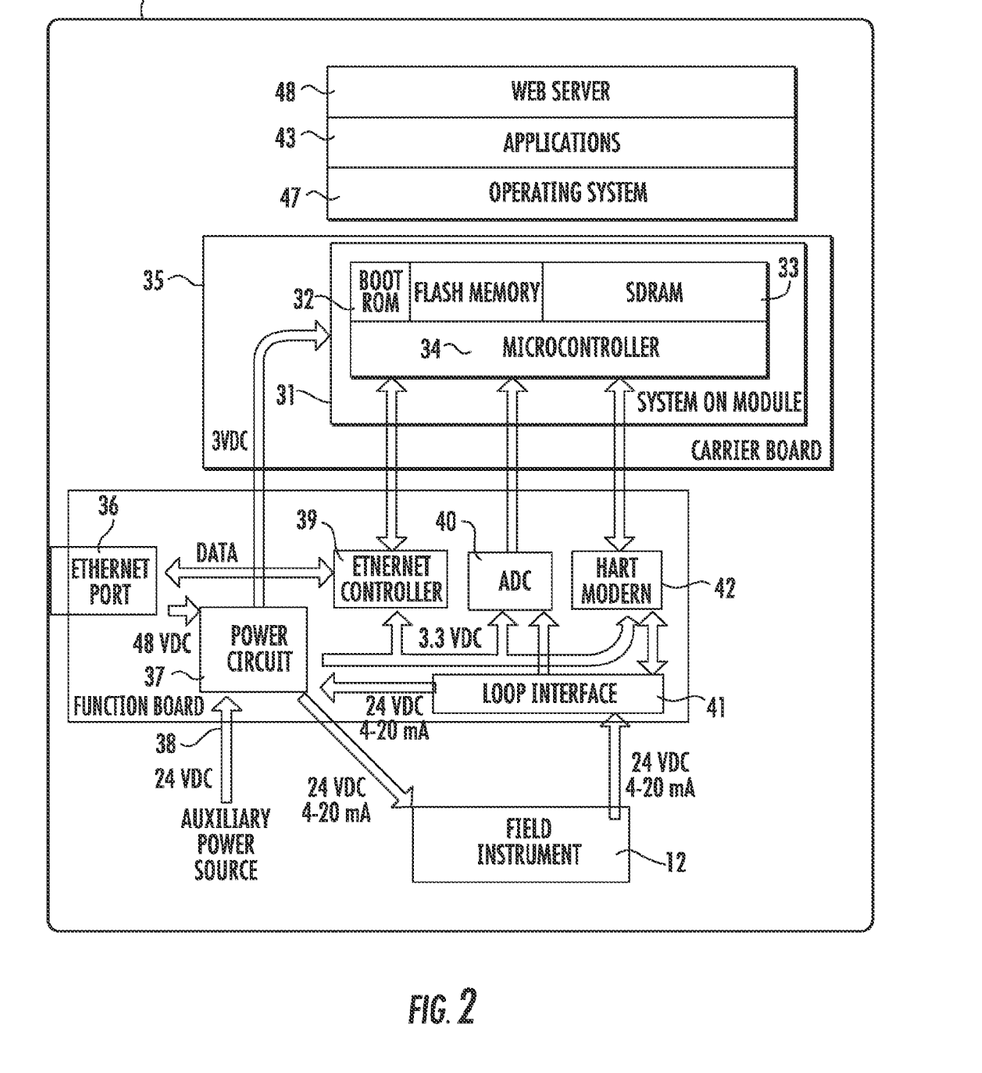
FIG. 2 is substantially a schematic view of a network adapter of one embodiment of the present invention.

FIG. 2 shows a modularized view of the network adapter 14 which is provided to convey functionality and may not represent the actual hardware design.

The network adapter 14 features a centralized processor 31 which may be in the form of a System-on-Module (SOM). It may utilize a PC-like architecture with static memory 32 for program and data storage, and volatile memory 33 for program execution. The CPU 34 may be a full-featured microprocessor with a standard architecture, such as ARM, that can yield a robust capacity for controlling external I/O and communications.

The network adapter 14 may contain one or more circuit boards 35 used for mounting the centralized processor 31 and any peripheral components, such as discrete ICs, fixtures, or connectors. The centralized processor 31 and peripheral components may be attached via modular connectors or soldered to the mounting boards, but they represent a monolithic system that is designed to work together.

An Ethernet port 36 is the means by which the network adapter 14 is connected to a communication network. This connection may be via an RJ-45 jack, screw or clamp terminals, punch down block, or some other form of mechanical connector. This connector may be accessible without opening the network adapter 14 enclosure. The network adapter port is fully compliant with PoE standard IEEE 802.3af.

Power circuitry 37 is provided to perform several functions. First, it separates the incoming PoE power from the Ethernet signals. Second, it performs the functions required of a powered device per IEEE802.3af. Third, it converts the source voltage into voltages used by the CPU 34 and auxiliary components. Fourth, it powers the 24 VDC analog current loop required by the external field instrument 12. Fifth, it detects and utilizes external power input from the auxiliary power port 38. The auxiliary power port 38 is the means by which a local 24 VDC source can be used to power the network adapter 14 in lieu of PoE power. In one embodiment, the mechanical connector for the auxiliary power may be any suitable type of modular jack or screw or clamp terminals.

An Ethernet controller 39 may be provided which may be intrinsic to the CPU 34 or SOM, or it may be implemented as an additional IC attached to the mounting board. It will enable the network adapter 14 to communicate over a standard Ethernet network. Data rates of 10 Mbps, 100 Mbps, or 1000 Mbps may be supported.

An Analog to Digital Converter (ADC) 40 is responsible for converting an analog input into a digital value. The input being converted is the current level within the field instrument signal loop. The ADC 40 may be implemented as either an intrinsic feature of the CPU 34, or as a custom design on the circuit board.

A loop interface 41 enables the network adapter 14 to read data and commands from and write data and commands to the analog current loop that connects the network adapter 14 to the external field instrument 12. The loop interface 41 may be used by the HART modem (described below) and/or the ADC 40.

The field instrument 12 represents an external piece of equipment that is attached to the network adapter 14 via a 2 or 4-wire 4-20 mA current loop. In various embodiments, the field instrument 12 may be a pressure transmitter, flow transmitter, temperature transmitter, analyzer, or other instrument that operates on a 24 VDC source. The network adapter 14 may be designed to attach structurally to the field instrument 12 or in a separate location. In one embodiment, the signal cable from the field instrument 12 may attach to the network adapter 14 via any suitable form of terminal block or modular connector. Field instrument 12 may be externally powered or it may be powered by network adapter 14.

The CPU 31 may support an operating system 47 such as Linux. Application specific programs in an application layer 43 may run on the operating system to execute the outlined functions of the network adapter 14. The network adapter 14 may host an embedded web server 48 that will display a user interface. The user interface will facilitate the exchange of data and commands with the network adapter 14 and any attached field instruments 12.

To support a wide range of industrial applications, in various embodiments the network adapter 14 may be designed to have an industrial temperature rating for operation (−40° C. to +85° C.). An enclosure of the network adapter 14 may be corrosion and weather resistant equivalent to an NEMA-4× rating. In addition, the enclosure or casing of the network adapter 14 may be suitable for direct mounting to a field instrument without modification or external support, e.g. by providing a suitable form of complementary engagement on the casing. Any openings may be characterized by sealed covers or seal-tight fittings.

In one embodiment, the network adapter 14 may be compatible with wireless radio components. It may support the addition of either internal or external transceivers. Operational functions of the network adapter 14 may include automatic power-on startup, self diagnostics, error logging, remote reset, remote firmware upgrades and data storage in local memory.

In one embodiment, a HART modem 42 is provided that enables the network adapter 14 to act as a HART master in order to communicate with HART enabled field instruments. As a minimum, the universal HART API commands may be supported.

The network adapter 14 may be considered to be "stand alone" meaning no server interaction is required in order to perform application layer functional operations. Lower layer functions such as dynamic IP addressing, bootstrap, etc. may require the use of a server.

A robust and feature-rich software stack may be provided to the network adapter 14 in order to provide value added command, control and field data acquisition. The latest in open-source and web-based technologies may be supplied as a basis for the system. Open standard protocols may be implemented as appropriate. The primary goal of the software on the network adapter 14 is to capture and archive the data stream supplied from the microprocessor and provide a rich interface to access such data and manage the field device.

The software may run on an operating system such as Linux, Windows, or other proprietary or non-proprietary operating system (OS) or real-time operating system (RTOS). The network adapter 14 may be self-booting upon reset. The bootstrap may implement a mechanism for software boot image delivery which utilizes Dynamic Host Configuration Protocol (DHCP) and trivial file transfer protocol (TFTP) to transmit software images. This way, the network adapter 14 may be shipped with blank NAND flash (rewritable) where the primary operating system will be loaded and stored persistently.

The non-volatile memory may have two partitions; one for primary booting and one for secondary booting. The secondary boot sector will provide redundancy in case the primary boot sector becomes corrupted.

The primary interface for the end user may be via Web pages served from a Web server 48 running locally on the network adapter 14. While certain functions may be performed via Secure SHell (SSH), a Web browser may be the primary way to interact with the device. The server may supply the option of connecting securely with a web browser and may use Transport Layer Security (TLS) via HTTPS.

The functions accessible via the Web server may include configuration, diagnostics, HART communications, live data display, historical data logs and stored documentation.

In one embodiment, both static and dynamic IP addressing may be supported. Dynamic Host Configuration Protocol (DHCP) per RFC2131 may be supported. Other supported protocols may include Secure Shell version 2 (SSH-2) per RFC 4251, secure copy and secure FTP for file transfer, TFTP per RFC 1350, SNMP and NTP.

A User Interface (UI) application in an application layer 43 (FIG. 2) provides the primary mechanism for users to interact with the network adapter 14 through the use of a Web Browser. In one embodiment, the UI of the network adapter 14 is designed for simple use with minimal depth of drill down menus and minimal number of "clicks" needed to perform important functions. The use of text and graphics is also minimized in the best interest of simplicity and readability. In particular, the UI design may be created to function from within a 240×320 pixel window. The window may be able to be resized per user preference. The small standard window size will accommodate displaying multiple windows on a normal PC screen and/or displaying the UI on mobile browser devices.

An interface/menu system may be provided for browser navigation. In one embodiment, all screens have a return to Home button with the exception of the Home Screen. In addition to the Home button, each screen may have no more than five navigation buttons. An embodiment of the interface menu system may be as outlined below with the numbered hierarchy:

1. Security
2. Home (Main Menu)
3. Settings
   3.1. About
   3.2. Update
      3.2.1. Upload
      3.2.2. Download
   3.3. System
      3.3.1. Regional Settings
         3.3.1.1. Clock
         3.3.1.2. Language
      3.3.2. Administrator Link (Administrator only password coded link to access help. Used in extreme cases or emergencies for re-flashing all or part of the system, and/or changing purchased options. Also used for tech support.) Also provides the SSH Troubleshooting "back door."
         3.3.2.1.1. SCRUB —reset to factory (destroys persistent data)
   3.4. Security
      3.4.1. Change Password
      3.4.2. Users
         3.4.2.1. Add/Remove
         3.4.2.2. Edit
         3.4.2.3. Permissions (Groups)
      3.4.3. Reset Defaults
   3.5. Configure Device
      3.5.1. Select Field Device Type
         3.5.1.1. Flow
         3.5.1.2. Level
         3.5.1.3. Pressure
         3.5.1.4. Temperature
         3.5.1.5. Other
      3.5.2. Engineering Units
         3.5.2.1. List of pre-loaded engineering units
         3.5.2.2. User defined engineering units/value pair input
      3.5.3. Device Signal Type
         3.5.3.1. Analog
         3.5.3.2. Discrete
      3.5.4. Field Device Data
         3.5.4.1. Tag Number
         3.5.4.2. Device Location
         3.5.4.3. Device Address/Node?
         3.5.4.4. Manufacturer
         3.5.4.5. Model Number
         3.5.4.6. Serial Number
      3.5.5. IP Settings
         3.5.5.1. IP Configuration
         3.5.5.2. Enter IP
            3.5.5.2.1. Subnet
            3.5.5.2.2. Gateway
            3.5.5.2.3. DNS
         3.5.5.3. Obtain IP Automatically
         3.5.5.4. TCP/IP Filtering?
         3.5.5.5. MAC Address (Read Only)
4. Diagnostics
   4.1. Ping Tool
   4.2. Device Status —troubleshoot directly on the device through Serial port or other suitable interface.
      4.2.1. Power
      4.2.2. Field Device Present
      4.2.3. Connection Status to the network
      4.2.4. Activity Status (View sent and received packets)
      4.2.5. Repair (password required)-bring Ethernet interface up/down, etc.
   4.3. View Available Networks
      4.3.1. Change Network (password required)
         4.3.1.1. Choose Network
         4.3.1.2. Confirm Network Change
   4.4. Folder Storage Status (see 8 below)
5. HART
   5.1. HART features are device specific
   5.2. When HART is active, it shall override shared user defined parameters
6. Data (View live data from Field Device)
   6.1. Data refresh rate
7. Logs
   7.1. View Data Log
   7.2. Configure Data Log
      7.2.1. Set Resolution (hours, minutes, seconds, milliseconds)
      7.2.2. Elapsed time since last reset
   7.3. Uptime Log (read only)
   7.4. Connection Log?
8. Folders
   8.1. Create Folder
   8.2. Browse Folders
   8.3. Delete Folder
   8.4. Import Folder
   8.5. Export Folder The HART Communications Protocol is an industrial automation protocol that can communicate over legacy 4-20 mA analog instrumentation wiring. As described above, the network adapter 14 may include a HART modem 42 in a Master configuration which enables it to communicate with and control a HART enabled field device. The HART API will provide a method for the application layer to push instructions to the field device. The HART command set may include three classes of commands: universal, common practice, and device specific. The HART API may incorporate the universal and common practice commands. These commands are shown in Table 1.

TABLE 1

HART command summary table

| Universal Commands | Common Practice Commands |
|---|---|
| Read manufacturer and device type | Read selection of up to four dynamic variables |
| Read primary variable (PV) and units | Write damping time constant |
| Read current output and percent of range | Write device range values |
| Read up to four predefined dynamic variables | Calibrate (set zero, set span) |
| Read or write eight-character tag, 16-character descriptor, date | Set fixed output current |
| Read or write 32-character message | Perform self-test |
| Read device range values, units, and damping time constant | Perform master reset |
| Read or write final assembly number | Trim PV zero |
| Write polling address | Write PV unit |
|  | Trim DAC zero and gain |
|  | Write transfer function (square root/linear) |
|  | Write sensor serial number |
|  | Read or write dynamic variable assignments |

Methods to provide an identity for the network adapter 14 may be provided in the form of one or more Application Program Interfaces (API)s the application layer 43. In particular, APIs to access MAC Address, IP Address, serial number (if stored in non volatile memory) may be provided. This information may be stored in the non-volatile memory 32 (FIG. 2). The identity of the network adapter 14 may be capable of being retrieved at the application layer and displayed via Web browser. A device information Web page may provide the display of network adapter IDs as well as other User-defined information.

User entered data may be stored in non-volatile memory 32 (FIG. 2) and shall survive software updates. Any changes to the device made through the Web browser or via SSH may be logged to the network adapter 14 and that history record may be made available to the user through the Web browser interface.

Application software may also provide a data acquisition interface that allows the application layer to obtain access to the data stream from the on-board microprocessor 34. All data which is captured by the application layer may be logged and stored in a rotating archive (FIFO). The amount of data that is able to be stored is variable and should be calculated based on the amount of data being stored and the amount of free memory available.

A synopsis for how the application layer may access data from the field device is as follows. The analog current loop Process Variable (PV) value will be input to the Analog to Digital Converter 40 and stored in a register. The firmware should update this value every 20 ms (or less frequently, depending on user requirements) and write it to an assigned variable. The variable should be a data type that can store both the data value and its corresponding time stamp. A method to compress logs may also be available. A parser and API may provide access to the logs through the Web browser as well as via SSH. A method to sort the log by date and other relevant fields may be provided. An export function may allow logs to be downloaded via CSV, HTTP(s) or SCP. It may be possible to view logging in real time via SSH.

Software upgrades for the network adapter 14 may be provided via the Web server or via Secure Shell. The web server may provide a web page, which allows a user to browse a local file system on the accessing device, upload an update package to the network adapter 14, and initiate an update. In one embodiment, it may be possible to update only the software components that have changed. In one embodiment, it may be possible to instruct the network adapter 14 to completely replace its primary operating system. This may be facilitated by instructing the device to erase its master boot record through an SSH session and force a reboot so that software is updated via a mechanisms similar to Etherboot. In these embodiments, user-defined data may survive both methods of software updates.

The network adapter 14 may also be configured to self-recover from a bad state. This may be implemented via a watchdog timer. OS or application corruption should not prevent the device from being reprogrammed. An external reprogramming port (not shown) may be included in the design.

Logs may be exportable via user-selectable formats using a Web browser and HTTP(s). Formats may include RAW-compressed which compresses all logs in their native format and downloads to accessing device; RAW-uncompressed which downloads a copy of the logs to the accessing device; and CSV which provides delimited text file which uses a comma to separate values per RFC 4180. A separate utility may be supplied to convert CSV or RAW to a suitable XML format based on a SCADA standard. This utility may be run on a separate accessing device.

A data transmission component to facilitate centralized data aggregation without requiring a client software update may be implemented, enabling the software to provide a mechanism to enable/disable transmission of data in real time (via Web browser) to a user specified IP Address/DNS entry and UDP port using an appropriate transmission protocol. The mechanism to specify the location to transmit to may be provided through DHCP options or specified directly through the Web browser interface. Both options may be provided with the local option overriding the DHCP default.

Figure 6:
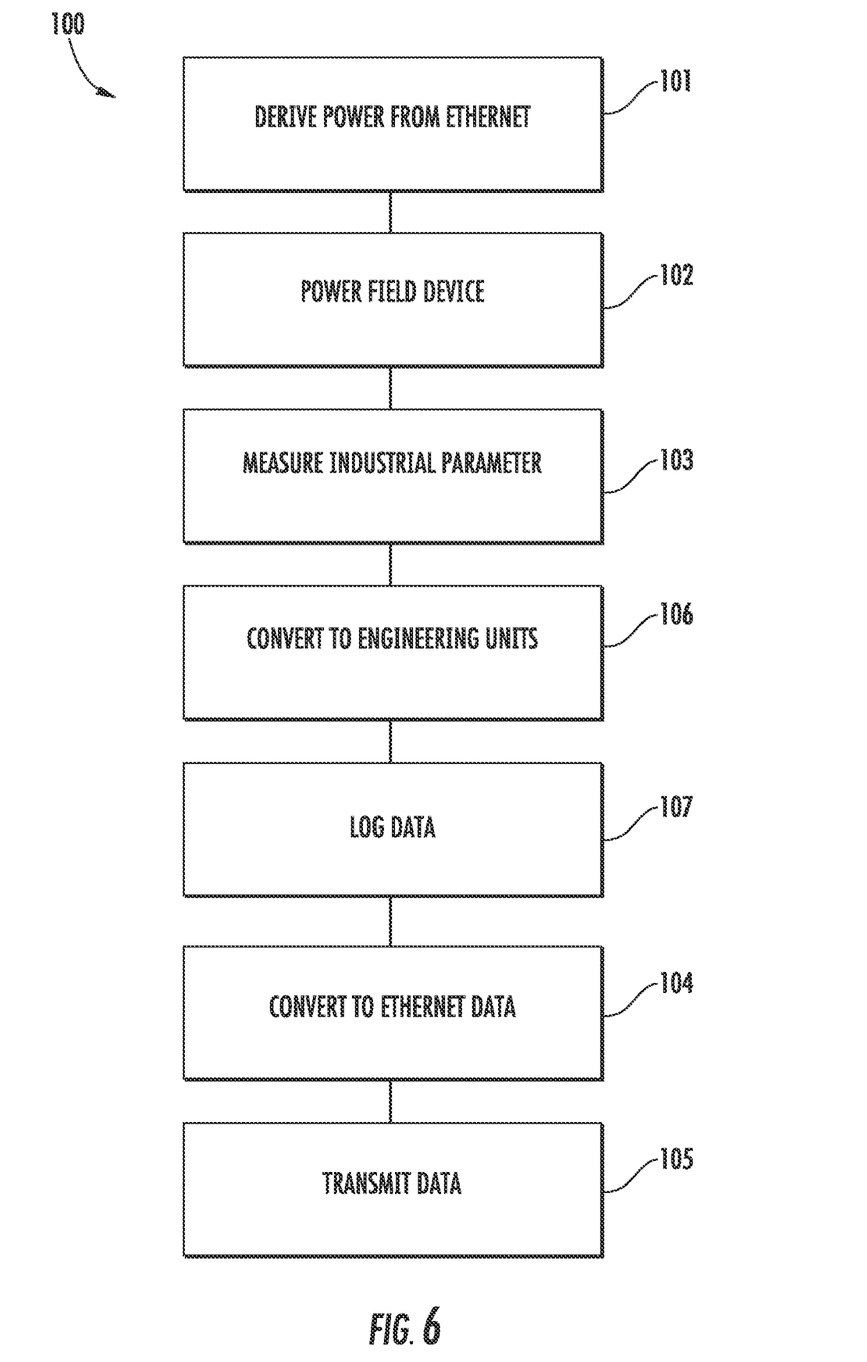
FIG. 6 is substantially a flowchart of a method for communicating between a field device and a central office.

A method for using the network adapter 14 to provide an industrial parameter from a field device to a central office will now be described with reference to FIGS. 1 and 2 and to the flowchart 100 of FIG. 6. At step 101, the network adapter 14 derives power from the Ethernet port 36 and powers the network adapter 14 and the field device 12 (step 102). An industrial parameter is measured from the field device 12 through the loop interface 41 (step 103) and it is transmitted to network adapter 14. Network adapter 14 may convert the data to engineering units (step 106) and it may log or store the data in a file in a memory device, such as non-volatile memory. In addition to data, network adapter 14 may store other administrative files, such as configuration files, manuals, maintenance data, etc, in a non-volatile memory device. These files may be access over the network or locally through a communication port, such as a universal serial bus (USB) for various administrative functions. The data may then be converted to Ethernet data by Ethernet controller 39 (step 104) before being transmitted to the central office 20 through Ethernet port 36 (step 105). It may be noted that many steps that are apparent to those of ordinary skill in the art.

The network adapter 14 may be easily attached to an existing field device 12 in a one to one relationship. That is, for each field device 12 in the network 10, there is a uniquely associated network adapter 14 such that the field device 12 and network adapter 14 provide an integral system. The use of the described network adapter pushes the Ethernet protocol all the way to the independent field devices, allowing each field device to have a virtual IP address by way of its respective associated network adapter. This in turn allows each field device to be directly accessed, monitored and controlled from any IP enabled browser, including mobile hand held browsers. Data values coming from the remote field devices can be simultaneously accessed from multiple locations and specialized or proprietary network interface cards (NIC) are not required to provided connectivity between the field device and an enterprise network or standalone workstation at the central office.

The network adapter 14 replaces existing proprietary industrial bus networks such as a HART network with a standard Ethernet network while providing the HART diagnostics and secondary variables should the user want to use them. In addition, the Ethernet network 10 is significantly faster and offers far greater scalability than HART or other existing bus networks and can be used with field devices that are not HART enabled. Because the network adapter 14 receives an analog input directly from the field device without use of an intermediate signal bus, the device is protocol independent, can be attached to any manufacturer's field device and can put literally thousands of devices onto one Ethernet network providing values to PLCs, DCS systems, HMI systems or browser based interfaces.

The use of the network adapter 14 provides increases in I/O beyond existing PLC/PLC cabinet capacities and reduces the cost of additional analog I/O into existing PLC infrastructures. The benefits of IP addressing protocols means that a single Ethernet port at a PLC or workstation can support a virtually unlimited number of field devices with the ability to monitor, manage and maintain the deployed field devices from a central office, remote locations or any internet browser-capable mobile device. In effect, each field device can be individually addressed through its associated network adapter, thus simultaneous access to data from multiple sources can be achieved.

Figure 3:
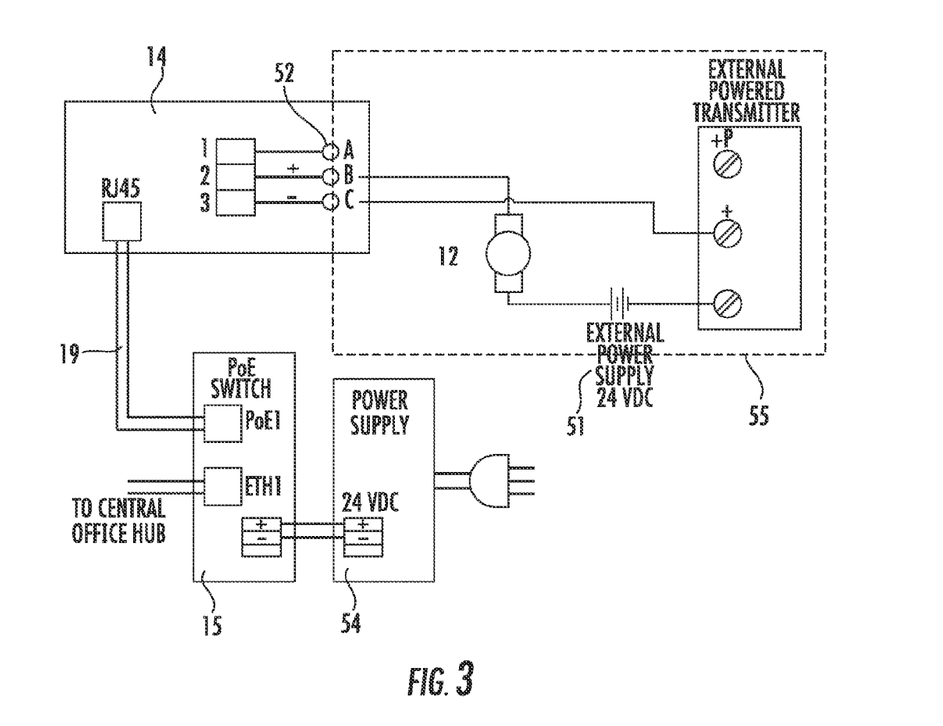
FIG. 3 is substantially a connection diagram for a network adapter.

In FIG. 3, there is shown a connection diagram showing connections between the PoE switch or midspan 15 and the network adapter 14. In the configuration shown, the PoE switch 15 receives power from power supply 54. The PoE switch 15 provides power to the network adapter 14 through Ethernet cabling 19. The analog current loop 55 is powered by an external 24 VDC power supply 51. Connection of the analog current loop to the network adapter 14 is through terminals B and C of terminal block 52 if field device 12 is externally powered. If the analog current loop is to be powered from the network adapter 14, terminal A and B would be used.

Figure 4:
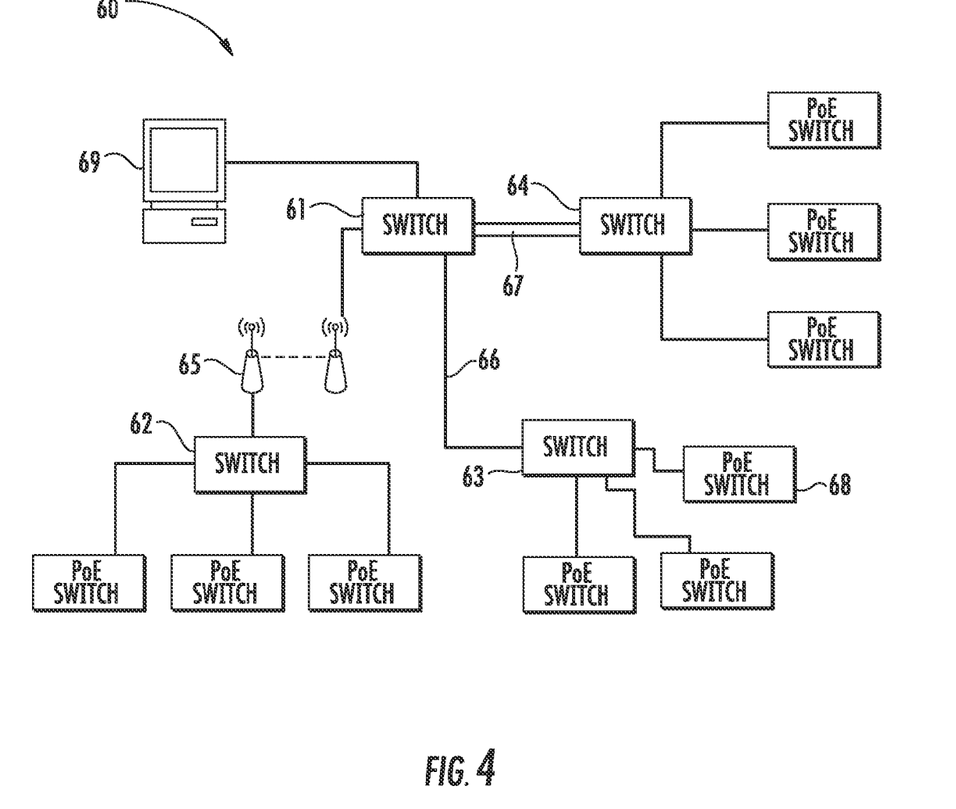
FIG. 4 is substantially a schematic view of a network in accordance with an alternative embodiment of the present invention.

While the size of the network in FIG. 1 is for illustrative purposes very small, there is virtually no practical limit to the number of devices that can be placed on a properly designed subnet. Remote PoE switches/midspans are available with a wide range of ports and each can be connected to intermediate switches in order to provide large network capabilities as shown in FIG. 4. In the network 60 of FIG. 4, a central Ethernet hub 61 at a central office 69 may be connected to remote Ethernet switches 62, 63, 64 via various means. For example, Ethernet hub 61 may connect to remote Ethernet switch 62 via wireless radio link 65, to remote Ethernet switch 63 via standard Ethernet cable 66 and to Ethernet switch 64 via fiber optic cable 67. Each remote Ethernet switch may then connect to a number of PoE switches 68 and each PoE switch 68 may connect to a suitable number of network adapter/field device systems.

Figure 5:
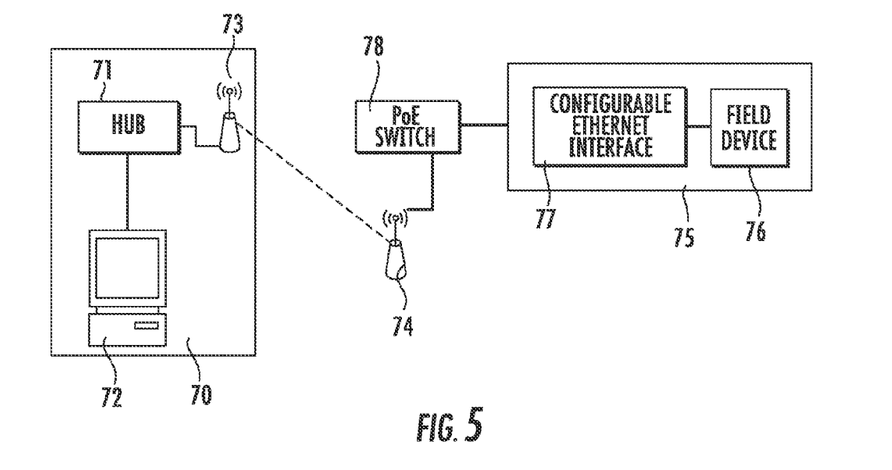
FIG. 5 is substantially a schematic view of a distributed or remote network.

An advantage of the present invention may be seen in widely distributed, i.e. remote applications where the field device in question may be greatly removed from the central office premises and more particularly where conventional cabling is impractical. An example of a remote embodiment is illustrated in FIG. 5. In this example, the central office 70 may have an Ethernet hub 71 connected to workstation 72. A wireless radio transmitter/receiver 73 communicates with a remote wireless radio transmitter/receiver 74 at a remote site of a field device system 75 that includes field device 76 and network adapter 77 of the type described previously. The remote transmitter/receiver 74 is PoE enabled and is powered by PoE switch or midspan 78 which also powers the field device system 75. Power to the PoE switch 78 may be provided by any suitable power device (not shown) depending on the application. For particularly remote applications, e.g. in rural environments, wilderness applications etc., the power supply include batteries, solar power, wind generators etc. While a single field device system is shown in this embodiment, a person skilled in the art will recognize that any number of field device systems may be provided to communicate by wireless radio with the central office 70.

While certain types of field devices and processes have been described, a person skilled in the art will readily understand that a greater range of field devices may be used and that the invention is not limited to any particular one or more field devices. A person skilled in the art will also understand that a greater or lesser number of field devices, network adapters, switches, hubs, workstations etc may be deployed within the scope of the invention as defined in the claims that follow.

Although the description above contains many specifications, these should not be construed as limiting the scope of the invention but as merely providing illustrations of some of the embodiments of this invention. Thus, the scope of the invention should be determined by the appended claims and their legal equivalents rather than by the examples given.

What is claimed is:

1. A system for interfacing with an industrial process, comprising:
    (A) at least one field device, the field device being configured to measure an industrial parameter and generate an analog signal, the analog signal containing data related to the industrial parameter;
    (B) at least one network adapter in communication with the field device, the network adapter comprising:
        (a) an Ethernet port; and
        (b) power circuitry configured to derive power from the Ethernet port and to provide power derived from the Ethernet port to the field device; and
    (C) wherein the network adapter couples directly to the at least one field device using an analogue current loop, wherein the network adapter provides power to the field device via the analog current loop, and wherein the network adapter is configured to read the analog signal from the field device on the analogue current loop, generate digital data from the analog signal, and transmit the digital data to a communication network through the Ethernet port.

2. The system according to claim 1 wherein the network adapter and the field device are co-located.

3. The system according to claim 2 wherein the network adapter is mounted on the field device.

4. The system according to claim 1 further comprising a Power-over-Ethernet enabled switch that provides power to the Ethernet port of the network adapter.

5. The system of claim 1 further comprising a wireless transmitter in communication with the network adapter, the wireless transmitter being configured to transmit the digital data.

6. The system of claim 1 wherein the network adapter is capable of transmitting the digital data using Internet Protocol.

7. The system of claim 1 wherein the network adapter comprises software configured to allow users to interface with the network adapter from a remote location over the communication network.

8. The system of claim 1 wherein the network adapter is configured to generate a control signal and transmit the control signal to the field device, the field device being configured to receive the control signal and perform an action in response to the control signal.

9. The system of claim 1 wherein the network adapter comprises an auxiliary power port, wherein the power circuitry is configured to detect auxiliary power on the auxiliary power port and provide the auxiliary power to the field device.

10. The system of claim 9 wherein the network adapter uses power from the auxiliary power port to power an analog current loop.

11. The system of claim 1 wherein the network adapter is uniquely associated with the field device.

12. The system of claim 1 wherein the field device is uniquely associated with the network adapter.

13. The system of claim 1 further comprising a plurality of network adapters and a plurality of field devices, each network adapter associated with a single field device.

14. The system of claim 1 further comprising a plurality of field devices, each field device being in communication with the network adapter.

15. The system of claim 1 wherein the network adapter comprises a Highway Addressable Remote Transducer (HART) for providing HART based communications with the field device.

16. The system of claim 1 wherein the network adapter further comprises a memory device configured to store data.

17. The system of claim 1 wherein the network adapter further comprising a memory device configured to store administrative files.

18. A network adapter for providing communication with an industrial field device, the network adapter comprising:
   (A) an analog communication circuit configured to receive analog signals from a field device;
   (B) a conversion circuit configured to convert the analog signals to digital data;
   (C) a transmission circuit for transmitting the digital data to a communication network, the transmission circuit comprising an Ethernet port;
   (D) power circuitry configured to derive power from the Ethernet port to power the network adapter; and
   (E) wherein the analogue communication circuit couples directly to the field device using an analogue current loop, wherein the network adapter provides power to the field device via the analog current loop, and wherein the network adapter is configured to read the analog signal from the field device on the analogue current loop.

19. The network adapter of claim 18 wherein the power circuitry is configured to provide power derived from the Ethernet port to the analog communication circuit, thereby powering the field device.

20. The network adapter of claim 18 further comprising a processor, memory and user interface software, wherein a user may interface with the network adapter remotely over the communication network.

21. The network adapter of claim 20 wherein the network adapter may receive and store an IP address over the communication network.

22. The network adapter of claim 18 comprising an auxiliary power port, wherein the power circuitry is configured to detect auxiliary power on the auxiliary power port and provide the auxiliary power to the field device.

23. A method for providing an industrial parameter from a field device to a central office, the method comprising:
   (A) deriving power from an Ethernet port of an Ethernet network adapter;
   (B) powering a field device from the Ethernet network adapter using an analogue current loop, wherein the network adapter provides power to the field device via the analog current loop, and wherein the network adapter is configured to read the analog signal from the field device on the analogue current loop;
   (C) measuring industrial parameter data from the field device in the Ethernet network adapter;
   (D) converting the industrial parameter data to Ethernet data; and
   (E) transmitting the Ethernet data from the Ethernet network adapter to the central office.

24. An IP addressable field device system comprising:
   (A) a field device comprising an analog current loop; and
   (B) a network adapter uniquely associated with the field device, the network adapter comprising:
      (a) an analog current loop interface that interfaces with the analog current loop;
      (b) an Ethernet module that receives an IP address from a network; and
      (c) a data processing system that converts data from the analog current loop interface to Ethernet packet data for transmission by the Ethernet module to the network.

25. The IP addressable field device system of claim 24 wherein the network adapter comprises:
   (A) at least one Ethernet port; and
   (B) power circuitry that derives power from the at least one Ethernet port.

26. The IP addressable field device system of claim 24 comprising an analog to digital converter that converts an analog signal of the analog current loop to digital data.

27. The IP addressable field device system according to claim 24 wherein the network adapter comprises a unique MAC address.

28. The IP addressable field device system according to claim 17 further comprising software that provides a user interface allowing a user to communicate with the field device using an IP protocol.

29. A field device system comprising:
   (A) an instrument that measures an analogue signal; and
   (B) an Ethernet interface uniquely associated with the instrument on an analogue current loop that converts the analogue signal to Ethernet packet data and transmits the Ethernet packet data from an Ethernet port, wherein the Ethernet interface derives power for the field device system from the Ethernet port.

30. The field device according to claim 29 further comprising a link between the instrument and the Ethernet interface.

31. The field device according to claim 30 wherein the link comprises a 2-wire or 4-wire current loop.

32. The network comprising a plurality of field device systems according to claim 29, each field device system being configured to communicate with a central office.

* * * * *